United States Patent [19]
Walty

[11] Patent Number: 4,818,842
[45] Date of Patent: Apr. 4, 1989

[54] DIESEL FUEL HEATER

[76] Inventor: Robert J. Walty, 1015 Guadalajara Dr., Encinitas, Calif. 92024

[21] Appl. No.: 899,010

[22] Filed: Aug. 22, 1986

[51] Int. Cl.[4] .......................... F02M 31/12; F24H 3/04
[52] U.S. Cl. ..................................... 219/205; 123/549; 123/557; 138/38; 219/207; 219/301; 219/505
[58] Field of Search ............... 219/205, 381, 382, 307, 219/374, 206, 207, 301; 123/519, 557, 549; 210/184, 186; 138/38; 165/109.1

[56] References Cited

U.S. PATENT DOCUMENTS

| | | | |
|---|---|---|---|
| 2,869,836 | 1/1959 | Huet | 165/179 |
| 3,195,627 | 7/1965 | Goodloe | 138/38 |
| 3,438,434 | 4/1969 | Smith | 165/109.1 |
| 3,517,162 | 6/1970 | Webb | 219/364 |
| 3,934,117 | 1/1976 | Schladitz | 219/374 |
| 4,032,752 | 6/1977 | Ohmura et al. | 219/381 |
| 4,091,265 | 5/1978 | Richards et al. | 219/501 |
| 4,208,996 | 6/1980 | Lancaster | 123/557 |
| 4,310,747 | 1/1982 | Rice et al. | 219/381 |
| 4,345,141 | 8/1982 | Little | 123/557 |
| 4,346,285 | 8/1982 | Nakamura et al. | 219/381 |
| 4,349,001 | 9/1982 | Wagner | 123/557 |
| 4,349,013 | 9/1982 | Uroshevich | 138/38 |
| 4,367,718 | 1/1983 | Heine | 219/207 |
| 4,372,279 | 2/1983 | Parks | 123/557 |
| 4,397,287 | 8/1983 | Pierard | 219/205 |
| 4,404,949 | 9/1983 | Bell | 219/205 |
| 4,424,422 | 1/1984 | Bell et al. | 219/205 |
| 4,477,715 | 10/1984 | Bell et al. | 219/205 |
| 4,479,477 | 10/1984 | Manchester | 210/186 |
| 4,585,924 | 4/1986 | Pakula | 123/549 |
| 4,600,825 | 7/1986 | Blazejovsky | 219/205 |

FOREIGN PATENT DOCUMENTS

| | | | |
|---|---|---|---|
| 2356401 | 5/1975 | Fed. Rep. of Germany | 219/381 |
| 125641 | 11/1978 | Japan | 219/505 |
| 1016573 | 1/1966 | United Kingdom | 138/38 |
| 2044430 | 10/1980 | United Kingdom | 138/38 |
| 2107782 | 5/1983 | United Kingdom | 219/205 |

OTHER PUBLICATIONS

"PTC Thermistors as Self-Regualting Heating Elements", by E. Andrich, Dec. 1969.

Primary Examiner—A. D. Pellinen
Assistant Examiner—Geoffrey S. Evans
Attorney, Agent, or Firm—Christie, Parker & Hale

[57] ABSTRACT

An in-line diesel fuel heater including a hollow elongated housing in heat conduction relationship with an electric resistance heater heats diesel fuel flowing through the housing to a temperature above the cloud point of the fuel. The hollow housing contains fins or fibers to create fluid turbulence to increase heat exchange between the fluid and the housing. An analog control circuit uses a positive temperature coefficient (PTC) thermistor to regulate the temperature of the housing at a constant temperature instead of controlling the power based on a measurement of the diesel fuel's temperature.

23 Claims, 6 Drawing Sheets

DIESEL FUEL HEATER

FIELD OF THE INVENTION

The present invention relates to diesel fuel heating systems and in particular to compact, low-cost, highly efficient heat exchangers characterized by substantial heat transfer capacity, a high heat transfer coefficient and a control circuit which provides for safe analog control of power supplied to the heating system.

BACKGROUND OF THE INVENTION

In certain applications, it is desirable to be able to quickly elevate the temperature of a liquid, particularly thermally sensitive liquids such as hydrocarbon fuels and lubricating oils. For instance, when automotive engines are operated in cold weather, it is highly desirable to be able to heat the fuel, particularly diesel fuel, above a certain threshold, called the cloud point, in order to raise its temperature to a level at which it may be readily pumped through the fuel filter to the engine when the engine is running. Diesel fuel below its cloud point normally will not pass through the tiny pores in the filter, and instead, because of its paraffin content, the fuel clogs the filter and causes the engine to stop.

In addition, electric fuel heaters, in the form of heat exchangers, can provide a warming of the fuel to facilitate starting of diesel engines in cold weather by preheating the fuel prior to cranking the engine, thus providing warmer, lower-viscosity, and hence more easily ignited fuel to the fuel injectors as starting of the engine commences.

Diesel engines, particularly truck engines and other heavy duty engines are notoriously hard to start when the ambient temperature is 32° F. or lower. To address this problem, diesel fuel heaters, i.e., heat exchangers of various flat plate and tube-type designs, have been provided. Examples of such electric diesel fuel heaters are shown in U.S. Pat. Nos. 4,208,996; 4,349,001; and 4,477,715. Other examples of fuel heating assemblies include U.S. Pat. Nos. 4,372,279 and 4,091,265.

A problem arises in the design of heat exchangers for diesel heaters, however, in that the maximum physical size of such units is limited because of the limited space available in the engine compartment. This in turn imposes a constraint on the heater in the form of a limiting the amount of surface area available to make contact with the diesel fuel and in a limitation in terms of the maximum tolerable temperature of the heat exchanging surface itself. It is clear in the case of combustible liquids such as hydrocarbon fluids, e.g., diesel fuel, that the temperature of the heat exchange surface must be limited to a level below the flash point of the fluid for safe operation. For diesel fuel this upper limit is approximately 160° F. In actuality, this limits the temperature differential of the heat exchanger surfaces or walls to a temperature value which is less than 160°. At the other end of the scale, because the cloud point of diesel fuel can be as high as 32° F., this means that the minimum temperature differential between the heat exchanger walls and the fuel being heated is limited to about 128° F. Hence, energy must be transferred to the bulk of the fuel with a temperature differential of 128° F. or less.

For conventional flat plate or tube type heat exchangers, the practical energy density is thus limited by the thermal resistance of the fuel to about 8 watts per square inch of surface area, a level which is impractical for the design of truly compact heat exchangers used as diesel fuel heaters.

The mathematical expression which defines the amount of heat which can be transferred by means of a heat exchanger is $Q = UA\Delta T$, where Q is the total energy transferred by the heat exchanger to the fluid to be heated; U is the overall heat-transfer coefficient; A is the physical dimensions of surface area in contact with the fluid; and $\Delta T$ is the difference in temperature between the heat exchanger surface and the fluid. In analyzing this equation, it can be seen that the objective in the design of a heat exchanger is to optimize or maximize Q, the total energy transferred.

The typical methods for doing this are to (a) increase the area A by the addition of such mechanical elements such as fins, a plurality of conduits in contact with the fluid, etc., or (b) to attempt to increase the overall heat transfer coefficient U by promoting turbulent flow (turbulence) of the fluid to be heated through the heat exchanger. Typically this is accomplished by pumping the liquid past the heat exchanger surface at such a high velocity as to cause the liquid to undergo turbulent flow very early in the course of its passage through the heat-exchanger stage.

An expression for the effectiveness of a heat exchanger is to relate the heated exterior surface required to a predetermined unit of heat energy transferred, for example, 1 kilowatt at a fixed $\Delta T$, namely, 128° F. Thus, a flat plate heat exchanger having an energy density of 8 watts/in.$^2$ capable of delivering 1 kw of energy to fuel at a $\Delta T$ of 128° F. would need 125 in.$^2$ of heated surface: 1000 watts/8 watts/ in.$^2$=125 in.$^2$.

Heat exchangers which increase the internal (fluid side) surface temperature while maintaining the outer heated surface temperature constant have been demonstrated. These exchangers include extrusions of aluminum with internal fins. Such exchangers provide a practical increase of inner surface area by a factor of about 3, hence allowing the outer heated surface to run at 3 times the watt density, or about 24 watts/in.$^2$, resulting in heat exchangers requiring only 41.7 in.$^2$ of heated surface: 1000 watts/24 watts/in.$^2$=41.7 in.$^2$.

In the first of the two solutions, there is a practical upper limitation on the physical size of the heat exchanger. Obviously the design of the engine, the engine compartment and the vehicle impose limitations on the space that is available for a heat exchanger, and hence there is an upper practical limit on the overall physical size of the heat exchanger and likewise the amount of surface area A.

With respect to the second solution, namely to increase the heat coefficient U, as has been indicated above, the closer the point of turbulent flow is brought relative to the entry point of the fluid and the more the overall design of the heat exchanger is directed to the concept of promoting and sustaining the condition of turbulent flow through the heat exchanger, the higher the heat exchange coefficient U becomes. This effect is limited however because of certain fluid dynamic characteristics which exist when a fluid contacts a surface such as the flat surface of a heat exchanger wall. The flow of a fluid, even a turbulent fluid, along a surface is characterized by the presence of a laminar layer or layers of fluid adjacent the surface of the heat exchanger. The fluid actually flows along the surface in the form of sheets or laminates of fluid of a finite thickness which are immediately adjacent that surface. These laminar layers represent the major thermal resistance in fluid systems.

The net effect of the presence of laminar boundary layers is to impair the efficiency of the heat exchanger. Laminar boundary layers are always present and cannot be eliminated, even at higher velocities. What occurs in moving the onset of turbulence closer to the inlet in the proper design of a heat exchanger is to shorten the length of the normal laminar flow zone adjacent the entry to the heat exchanger and to move the transition zone from laminar to turbulent closer to the leading edge or the entry point of the fluid to be heated. Even in the region of turbulent flow, it should be noted that a sublayer of laminar flow is still present. As is self-evident, one of the primary design criteria or objectives in the design of heat exchangers is to design a unit which is as small and as compact as it can be. The trade-off, however, when one endeavors to design a very compact or very short heat exchanger, is that the contribution or effect of the laminar boundary layer phenomenon is exaggerated because of the relatively small size and short length of the overall unit.

Another complication proceeding from small, compact heat exchangers is that if the heat source in the heat exchanger is to be a simple, planar electric heating element, then the surface area component A of the overall heat exchange equation is also limited to approximately the area of the planar heating element employed. While extended surfaces such as internal fins can improve the area factor somewhat, it is known that the efficiency of fins in liquids is low, resulting in higher weight per unit of heat transferred.

A further goal for heat exchangers, especially for diesel engines, is to minimize the pressure drop or "head loss" across the heat exchanger, while maximizing the overall heat transfer coefficient. This is especially important for diesel fuel systems because a limited amount of pumping force is available, i.e., 14 psi (one atmosphere of vacuum) on the fuel tank side of the fuel filter because the primary fuel pump is on the engine side of the fuel filter. Normally, a maximum pressure of 10 inches of mercury is allowed for the combination of fuel line, heater, filter and fittings with most of this being accounted for by the fuel filter element. Thus, it can be seen that, with conventional currently available heat exchangers, generating turbulent flow in a diesel fuel heater by causing a restricted flow path and hence high velocity results in high pressure drop or "head loss," an unacceptable method for increasing the overall heat transfer coefficient sufficiently to construct compact, high power diesel fuel heaters. The present invention provides a solution to the problems which have just been discussed.

SUMMARY OF THE PRESENT INVENTION

The present invention incorporates a novel, safe and effective means for analog control of high power electric heating elements to be used in diesel fuel heating.

The present invention further provides a compact, high watt density apparatus for heating temperature sensitive hydrocarbon liquids such as diesel fuel. In one embodiment, the invention incorporates therein a structure and method for limiting the development of the laminar boundary layer in what would be considered either the laminar or turbulent flow zones with a simple internal improvement not requiring tubes or fins, but capable of substantially increasing the heat-exchange capacity of any fluid heat-transfer surface of any geometry.

The improvement allows for the practical construction of very compact and light weight electrically heated fluid exchangers for hard-to-heat and temperature-sensitive hydrocarbon fluids such as diesel fuel.

In the heat exchanger according to the present invention, the power delivered to the heating means is controlled by an analog power control circuit which, by sensing the temperature of the housing via a barium titanate PTC thermistor in thermal contact with the housing, controls the current flow through metal oxide semiconductor power transistors and safely avoids damaging thermal effects to the fluid being heated or to the power transistors.

The invention also provides in another embodiment a fuel heating assembly utilizing an internally finned conduit in a rectangularly shaped hollow housing without any additional material in the interior of the housing to which at least one and preferably two planar heating elements are located in surface contact heat transfer relationship with the two opposed widest external walls of the housing.

The limiting of the laminar boundary layer in one embodiment is accomplished by providing that the heat-exchange surface on the liquid side of the heat exchanger is contacted by a plurality of non-metallic fibers which occupy less than 15% of the heat exchanger volume. In the presently preferred embodiment, these fibers are arranged such that they contact the interior surface of the heat exchanger at a plurality of points spaced close together, the distance between the contact points with the surface being less than two times the length of the fibers. The length of the fibers used can be discrete or continuous, but for efficient production of turbulence or mixing in the laminar region, the individual fibers should contact each other at distance intervals of between 5 to 10 times their fiber diameter.

A presently preferred example of a material which has these properties is known as reticulated polyurethane foam or reticulated melamine foam, a material which typically has less than a 10% solid volume, large interconnecting pores and fibers extending through the pores having a length to diameter ratio of about 8.

In one aspect, the invention provides a heat exchanger comprising an elongated housing having an entrance and an exit each with fittings for connection to a diesel engine fuel system and a fluid passage therethrough communicating with the entrance and exit. A mass of nonmetallic fibers is disposed within and fills the passage, the overall density of the mass of fibers being such as to occupy 15% or less of the physical volume of the passage. Heating means are also provided in physical contact with an external surface or surfaces of the housing for transmitting heat by conduction through the walls of the housing to the interior surfaces thereof.

The present invention is characterized by modular construction of the components including conduit and planar heating elements which achieves relatively high power and high heat transfer efficiency with low switched electric current. The invention is also characterized by redundant over temperature protection and inherently safe heater operation in the event of transistor failure. No liquid cooled heat sinking is required. The temperature sensing element, a PTC thermistor, is mounted in surface contact with the hollow housing to prevent oscillation. In the preferred embodiment, etched fuel planar heating elements are utilized which are two times more efficient than wire type heating elements per unit area. The invention is further characterized by substantially greater surface area for heat transfer enabling the present invention to reach higher power heating capabilities than heretofore.

DESCRIPTION OF THE DRAWINGS

These and other aspects of the invention will be better understood by reference to the figures of the drawing wherein.

DESCRIPTION OF A SPECIFIC EMBODIMENT

Figure 1:
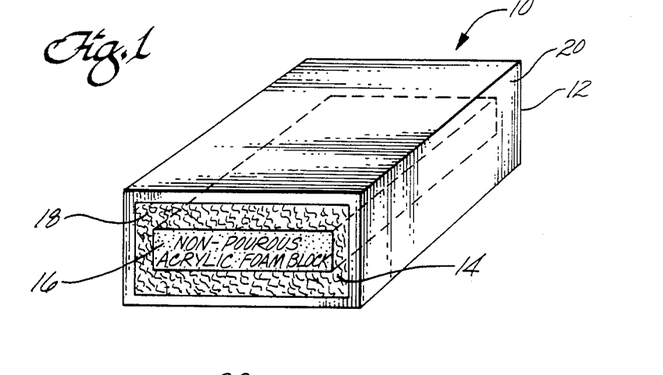
FIG. 1 is a perspective view and an exemplary design of a heat exchanger according to the present invention.

A heat exchanger 10 according to one embodiment of the present invention is shown in FIG. 1. The heater comprises a hollow, elongated housing 12 with a block of reticulated polyurethane foam 14 located in the interior of the housing and surrounding and supporting a non-porous acrylic foam block 16. As discussed in more detail at a later point in the description, the presence of the reticulated foam discourages and/or prevents laminar flow of the fluid to be heated as it passes through the unit from the fluid entrance 18 to the fluid exit 20.

In a conventional heater, the walls of housing 12 are heated by flat plate heater (not shown) so that the fluid passing through the housing comes in contact with the walls of the housing and heat transfer is thereby accomplished to elevate the temperature and to heat the fluid passing through the housing to the desired level. In the ordinary and conventional situation, the fluids passing through the housing are characterized by laminar layers of fluid with the layer adjacent to the interior surface of the housing walls acting as a barrier preventing efficient heat transfer to the fluid in the layers located more interiorly of the housing. The provision of the polyurethane foam fibers has the effect of inducing turbulence and mixing in the fluid flowing through the heat exchanger, thereby retarding or preventing the creation of the laminar layers and greatly enhancing the amount of fluid which comes in contact with the heat exchanger interior walls. By the addition of foam or fibrous foam to the present invention in the interior of a conventional heat-exchanger housing, approximately double the efficiency of heat exchange is accomplished.

Other configurations of heat exchangers, including exchangers in which fins are provided in the interiors to increase the surface area which comes in contact with the fluid to be heated are also suitable for use with the exchanger and control circuit of the present invention. A further increase in heat exchange is accomplished by such a configuration. When a heat exchanger according to the present invention having such a finned configuration is provided with reticulated foam, again, another approximate doubling of the efficiency of the heat exchanger is achieved.

The provision of the non-porous acrylic foam block 16 in the center of the channel has the effect of further reducing the conduit cross-section. By reducing the cross-sectional area available to the fluid passing through the housing, an increase in flow velocity is achieved. The higher the flow velocity, the better the turbulence inducing performance of the unit. The details of the functioning of the heat exchanger are as follows:

The heat exchanger surfaces on the interior or liquid side of the housing is contacted by a plurality of nonmetallic randomly or uniformly oriented fibers or elongated shapes which occupy less than 15% of the heat exchanger volume. These fiber contact the interior surface of the heater at a plurality of closely spaced points. In the preferred embodiment, the distance between contact points of surface and fibers is less than two times the length of the fibers. The fibers used can be continuous or discontinuous, but the distance between contact points of fiber and fiber is maintained at between five and ten times the diameter of the fibers.

As is indicated above, a presently preferred example of a material which has such properties is known as reticulated polyurethane foam. Such a material is characterized by a mass of interconnected fibers forming a block which typically has less than a ten percent solid volume. Large interconnecting pores extend throughout the material with the fibers comprising the mass having length between interconnect-to-diameter ratios of about 8. In addition to improved heat exchange performance, a heat exchanger according to the present invention having a fibrous mass in the interior can be made at least one-third more compact than one which does not employ it.

Figure 2:
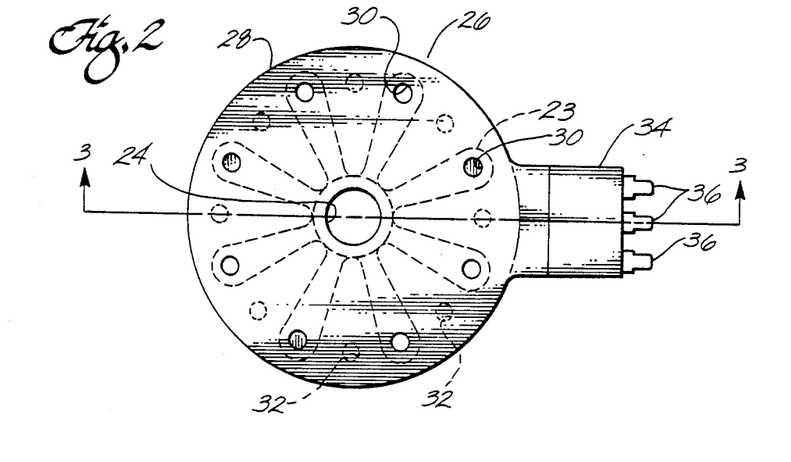
FIG. 2 is a plan view of a heater incorporating the electric circuit improvements of the present invention in a pancake design.
Figure 3:
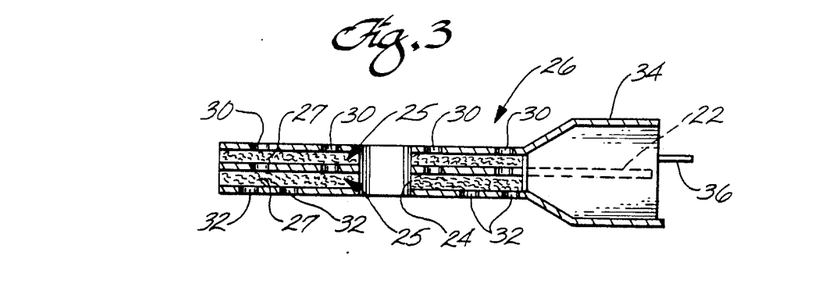
FIG. 3 is a sectional view taken along the line 3—3 of FIG. 2.

A particular configuration of an electric diesel fuel heater 26 according to the present invention is shown in plan view in FIG. 2 and in cross-sectional view in FIG. 3. As shown, the heater has a pancake configuration and comprises an etched planar heating element 22 (FIG. 3) disposed in the center of the heater. Element 22 includes a heater wire 23 which extends in a continuous manner around the heater in a pattern tracing a plurality of regularly spaced spokes or fingers extending from a central aperture 24 to the circular boundary 28 at the exterior of the heater. Bracketing the heater element 22 is a pair of heat exchanger chambers 25 filled with a mass of fibers or fibrous material 27 such as reticulated polyurethane foam. Aperture 24 is provided for receiving a mounting rod to enable the heater to be mounted on top of a conventional fuel filter, as will be seen in a subsequent portion of the description. A plurality of inlet apertures 30 are located in the top surface of the heater for permitting the fuel to be heated to enter the heater. On the underside of the heater, a second plurality of similar apertures 32 are provided offset from the location of the inlet apparatus, as the exit apertures for the heated fluid to pass from the heater into, for example, a fuel filter. An enlarged housing 34 is provided at one side of heater 26 and is provided to house the power and control electronics (not shown) for the heater unit 26. As is seen in FIG. 3, the heating element 22 extends into the housing 34 where electrical connection with the power source and control electronics is established. A plurality of connectors 36 are provided for connecting heater 26 to a power source (not shown).

Figure 4:
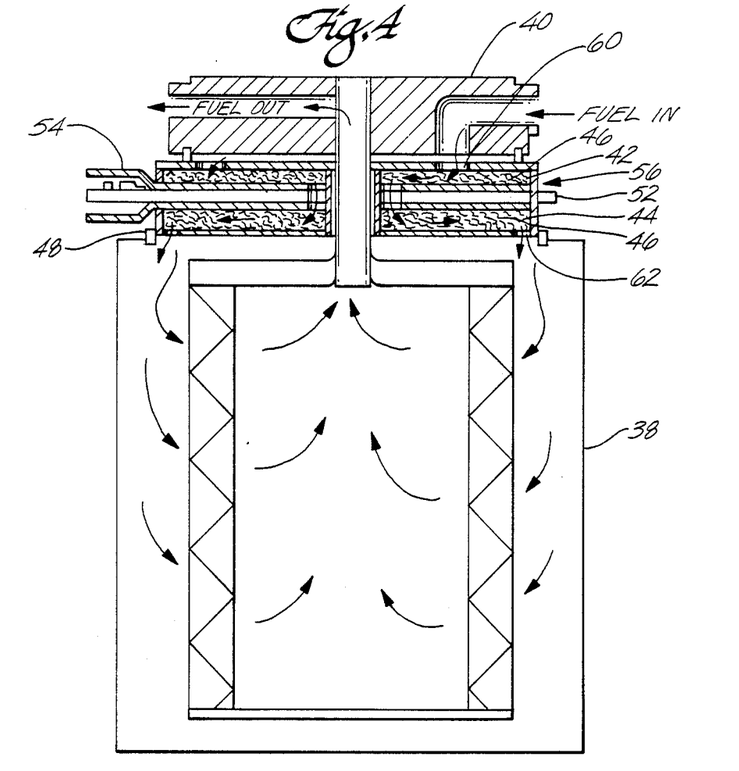
FIG. 4 is a sectional view of the pancake heater as shown in FIGS. 2 and 3 as utilized in a fuel-heating application in conjunction with a conventional fuel filter.

A typical installation of a heater or heat exchanger 26 as shown in FIGS. 2 and 3 is illustrated in the cross-sectional view of FIG. 4. As shown therein, a heater 56 is mounted on top of a conventional fuel filter 38 and a filter mounting cap 40 is provided to secure the heater 56 between the fuel filter 38 and the cap 40. The path of fuel through the heater and the fuel filter from inlet to outlet is traced by the arrows shown in FIG. 4. As seen in FIG. 4, a pancake shaped heating element 52 with control circuit housing 54 extending to one side is located in the center of heat exchanger 56. A chamber or cavity 42 is located above heating element 22 and a similar chamber or cavity 44 is located below the heating element. Each of these cavities is filled with foam fibers 46 according to the improved design of the present invention. Inlet and outlet apertures 60, 62 in the upper and lower surfaces of the housing of the heater are likewise shown with arrows simulating the fuel to be heated passing through these inlet and outlet apertures as the fuel traces its flow path through the assembly. A gasket 48 is provided for sealing the unit to the fuel filter and preventing leaks.

Figure 5:
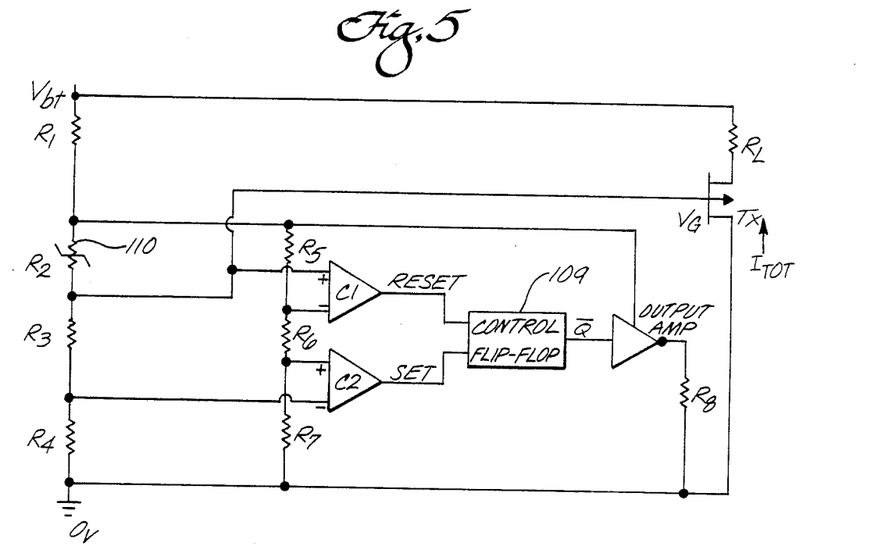
FIG. 5 is a schematic diagram of a circuit according to the present invention providing for protection of the power transistors from thermal overload during analog switching cycles.

The control circuit for the present invention is shown in FIG. 5. It is typical of power transistors such as metal oxide semi-conductor (MOS) power transistors to have a low "on state" resistance, so that when driving a load, the power generated in the power transistor is a small portion of the total power. Power transistors also have characteristic allowable power dissipation limits and predetermined relationships between drive voltage and current.

Since the relationship between the drive voltage and the voltage across the power transistor is typically a relatively flat one, this relationship can be converted into a corresponding relationship of resistance versus drive voltage once a value of supply voltage and "on state" current and resistance are set.

In the "on state," current is determined by the supply voltage and the load resistance. Thus, for any given supply voltage and load resistance, a power generating curve can be constructed, and the resistance at various drive voltages can be calculated.

It can be shown that in the process of limiting current in an analog way, a power transistor goes through a "power peak" which can exceed the transistor's maximum allowable power rating. This power peak occurs when the resistance of the transistor equals the resistance of the load. To handle such anomalous circuit behavior in the conventional solution, it is necessary to utilize power transistors having extremely high current and power dissipation ratings at 50° C. Although such transistors are available, they are inordinately expensive, so much so as to render such transistors impractical in most high-current, low-voltage applications.

The present invention therefore provides a circuit which allows analog control of power in one of two "safe" areas: the high-current, low-resistance area, and the low-current, high-resistance area.

This circuit detects the onset of a "power-peak" when the resistance of the transistor is approaching the resistance of a load and shifts it to the other safe operating area so rapidly that only a small and non-damaging thermal transient is felt. The circuit allows the use of simple analog controlled circuitry coupled with low-cost, low-power dissipation transistors for the control of high-power loads, making possible low-cost, compact power control of loads with none of the radio frequency noise emission problems associated with digital controllers or bi-metal thermostats. This control circuit according to the present invention is shown in FIG. 5 where:

$$10R_1 \simeq (R_2 + R_3 + R_4)$$

At low temperatures (i.e., room temperature, 25° C.):

$$R_2 \simeq R_3 \simeq R_4$$

and $$R_5 = R_6 = R_7$$

and $$(R_5 + R_6 + R_7) \simeq R_2 + R_3 + R_4/2$$

and the ratio $R_1:R_8$ is the $V_G$ shifted amount.

By adjusting the values of $R_3$ and $R_4$, the comparators $C_1$ and $C_2$ with reference voltages generated by voltage divider $R_5$, $R_6$, $R_7$ search out a voltage "window" which detects the falling value of $V_G$, and, at a preset level, where $P_{tx}$ (the power generated in the transistor) is becoming critical, changes the state of the control flipflop, turning the output amplifier "on."

This action increases the voltage drop across $R_1$, reducing $V_G$ instantaneously to a new lower level, where $I_{tot}$ is reduced to a safe level from a $P_{tx}$ point of view by dividing voltage with $R_8$. At this point, $I_{tot}$ is still controlled in an analog fashion by the action of $R_2$.

Should the temperature of $R_2$ decrease sufficiently, comparator $C_2$ will set the flipflop, turning the output amp "off" and returning $V_G$ to a full "on" level as set by the removal of current flow through $R_8$. It should be noted that this circuit can control more than one transistor simultaneously, even if load resistance $R_L$ for each is not the same. Thus, in operation, this circuit keeps the transistor from entering a high-power dissipation area both on increasing temperature and decreasing temperature.

Figure 6A:
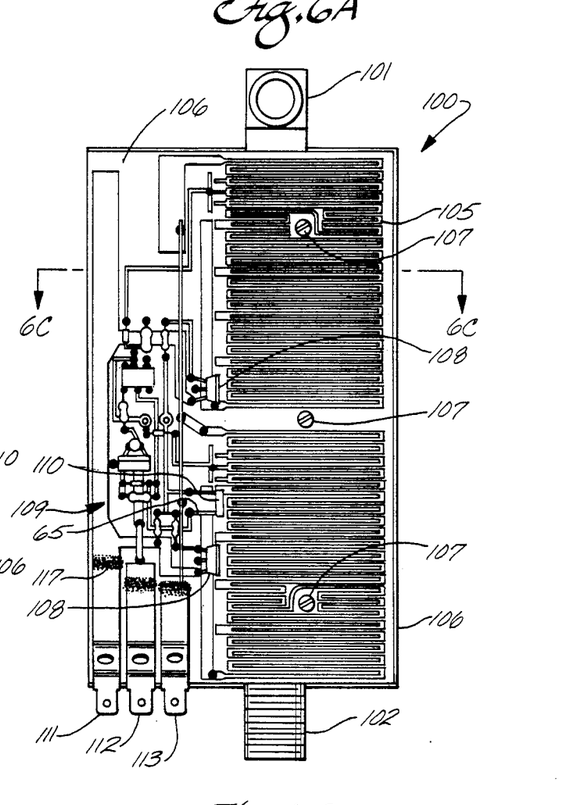
FIG. 6A is a plan view of another embodiment of a diesel fuel heater according to the present invention.
Figure 6B:
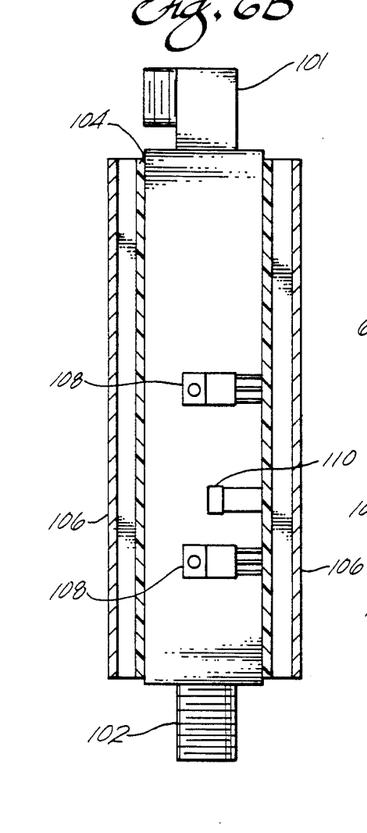
FIG. 6B is a side elevation view of the heater of FIG. 6A.
Figure 6C:
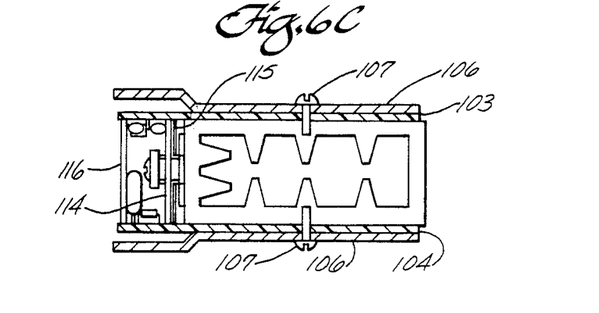
FIG. 6C is a view of the heater of FIG. 6A taken along lines 6C—6C.

FIGS. 6A, B, C are sectional views of another embodiment of a diesel fuel heater according to the present invention:

A heat exchanger 100, similar to that described in conjunction with FIG. 1, is fitted with end fittings 101 and 102 for connection to a diesel fuel supply system. Mounted to the outside of, and in good thermal contact with, heat exchanger 100 are one or more circuit boards 103 and 104, each including one or more serpentine etched heating elements 105, which cover greater than 30% of the contacted surface of heat exchanger 100. Each circuit board 103 and 104 is retained to the outer surfaces of heat exchanger 100 by formed aluminum plates 106 and screws 107. Screws 107 do not penetrate the wall of heat exchanger 100, so that there is no possibility of leaks, and no need for special sealing means. Current flow through each of the etched serpentine heating elements 105 is controlled by metal oxide semiconductor (MOS) power transistors 108 via the analog circuit arrangement 109 in FIG. 5. A temperature-sensing element 110 (R₂ in FIG. 5), a positive temperature coefficient (PTC) thermistor of barium titanate is mounted to heat exchanger 100 by any appropriate mechanical means (not shown) which insures good thermal contact with the exchanger 100, and in thermal commutation through heat exchanger 100, to transistors 108, heaters 103 and 104 and the fuel to be heated in the interior of the exchanger. PTC thermistor 110 is of a type which exhibits a very abrupt anomalous rise in resistance of about 2 orders of magnitude over a 10° F. temperature change, with this anomaly being centered between 140° F.-150° F. for the present application. PTC thermistor 110 (R₂) is connected to control circuit 109 as shown in FIG. 5.

Control circuit 109 is enabled by a positive voltage being applied to connector 111. This positive voltage may originate from an operator-activated switch in the vehicle, or by an on-board engine control computer, and is in the electric current range of less than 100 milliamps. Connector 112 is connected directly to a vehicle system positive power source, $V_{bt}$ in FIG. 5, while connector 113 is connected to vehicle ground $O_v$ in FIG. 5. Connectors 112 and 113 bring virtually all of the power into the heating system, for example, on a system which generates 500 watts on a 14 volt supply, connectors 112 and 113 would carry about 35 amps while connector 111 would carry only 0.1 amps. The physical size of heat exchanger 100 is practically made smallest when heat is applied to both sides of the exchanger, rather than just one, so a second circuit board 104 is applied to the external surface of the exchanger 100 opposite circuit board 103. Power is supplied to circuit board 104 via jumper wires 114 and 115 from connectors wires 112 and 113 respectively. The gate voltage, $V_G$ in FIG. 5 is supplied to MOS power transistors on circuit board 104 via jumper wire 116 connecting to the output of control circuit 109 at 117. There need be only one circuit board 103 containing control circuit 109, but there may be as many circuit boards 104 connected likewise in parallel as are necessary to create diesel fuel heaters of any required wattage.

Figure 7:
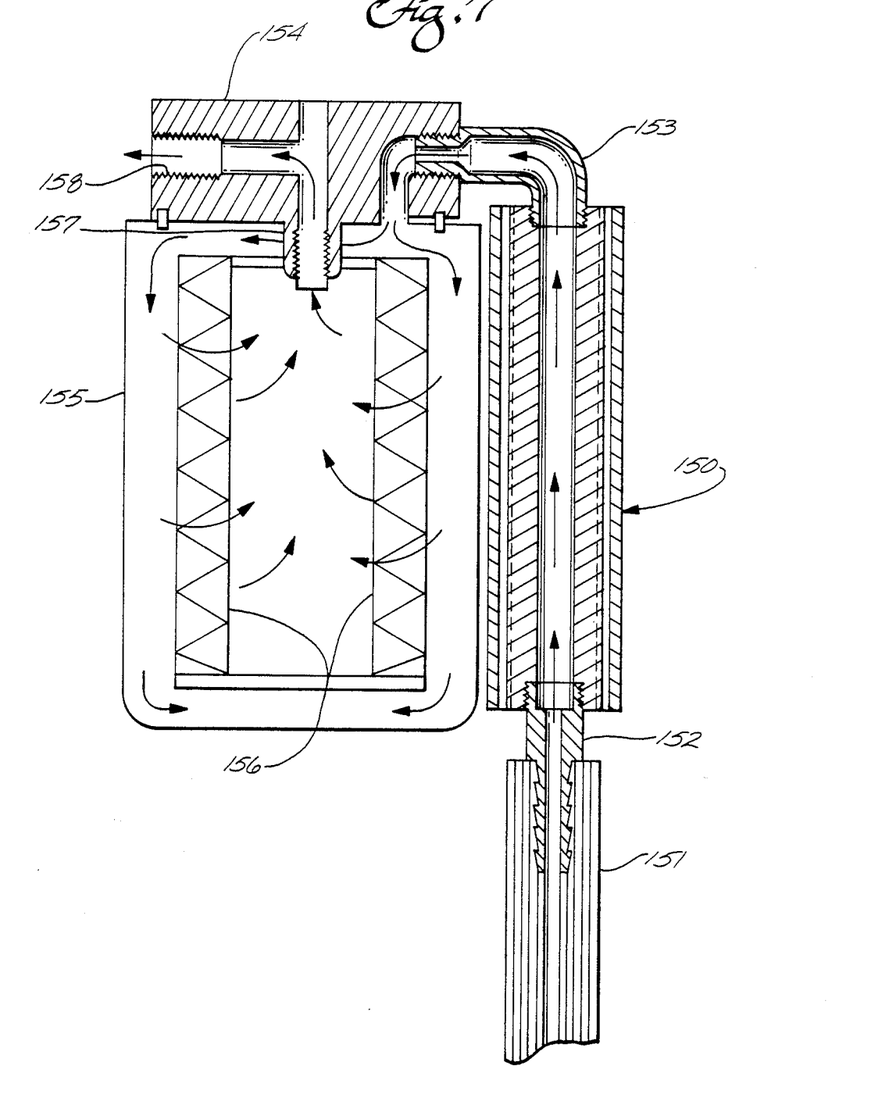
FIG. 7 is a sectional view of the diesel fuel heater of FIG. 6 connected to a diesel fuel system.

FIG. 7 is a sectional view of a diesel fuel heater 150 as described in FIG. 6 connected to a diesel fuel system, so that fuel may flow from fuel supply hose 151 through fitting 152 through diesel fuel heater 150 containing high watt density heating elements and having the ability to transfer this high watt heat density to the fuel passing through it, while maintaining the body of heater 150 at less than 160° F. Fuel warmed by heater 150 passes through outlet fitting 153, said fitting being the sole support for heater 150, and into diesel fuel filter mounting 154 where it is distributed to diesel fuel filter cartridge 155. Fuel once in cartridge 155 passes through filter element 156 without clogging the typically 5 micron diameter pores of element 156, having been warmed above the cloud point by heater 150. Fuel having passed through filter 156 is collected in the center of cartridge 155 and exits by way of threaded fitting 157 back into filter mounting 154 and finally out through exit fitting 158 to the diesel engine.

Figure 8:
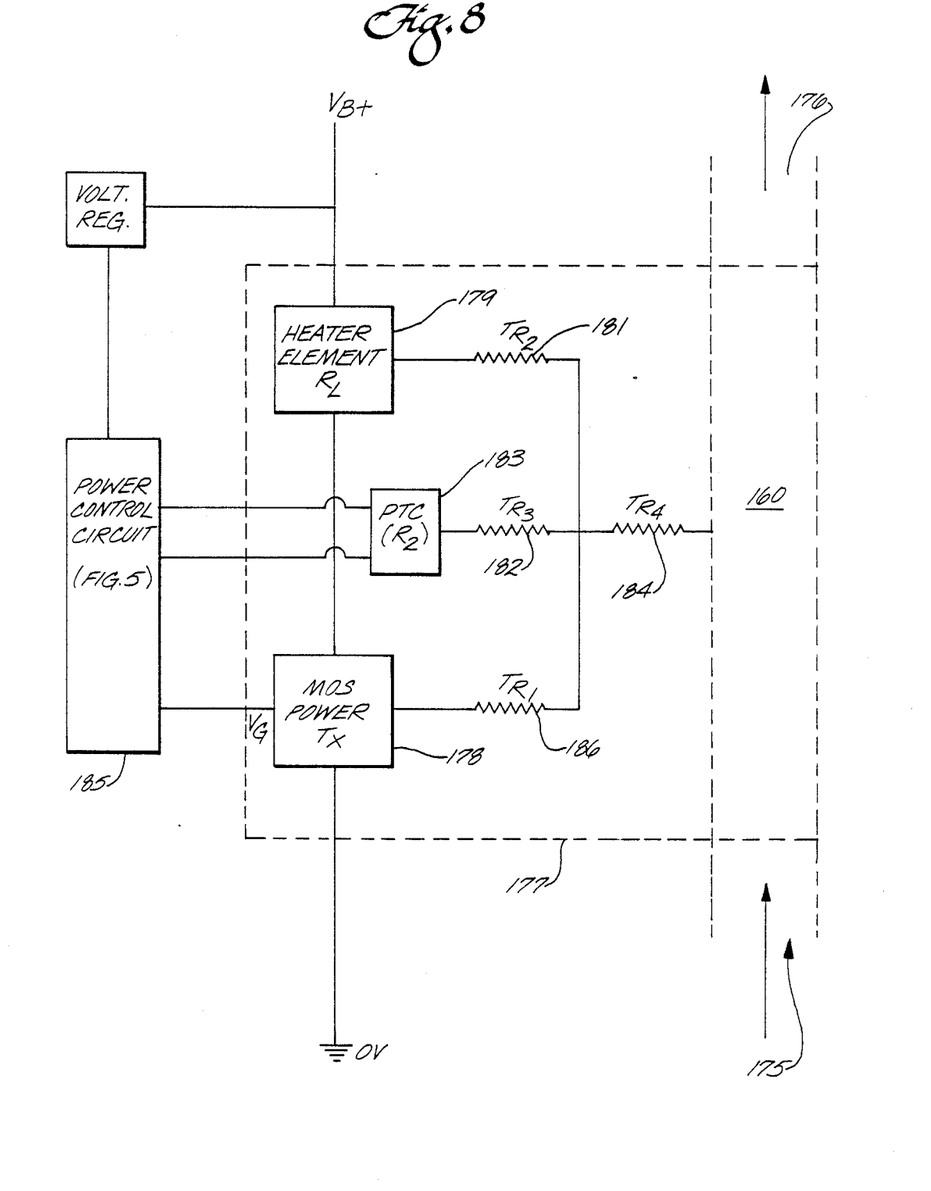
FIG. 8 is a block/schematic diagram of the diesel fuel system according to the present invention.

FIG. 8 is a schematic representation of the electrical and thermal relationships of the present invention.

Fuel flowing through the fuel passage 160 from entrance 175 to exit 176 draws heat away from heat exchanger body 177, represented by a dotted line encircling the thermally contacting components. Depending on the operating state of the heater system, the MOS power transistors 178 and/or the heating elements, $R_L$, 179 may be generating heat at high watt densities, i.e., greater than 10 watts per square inch of their respective surfaces areas. This generated heat is transferred to the fuel through a thermal resistance composed of the sum of the interface to the heat generating device plus thermal resistance of the housing of the heat exchanger 177. (The film coefficient of the fuel flowing through the passage from 175 to 176 is dealt with separately.) These thermal resistances are represented as $T_{R1}$, $T_{R2}$ and $T_{R3}$ (180, 181, and 182 respectively as shown in FIG. 8) for the thermal resistance between the inner surface of the heat exchanger housing 177, the MOS power transistor 178, the $R_L$ heater 179 and the PTC sensor 183 respectively. These three thermal resistances all have a common connection to the fuel in passage 160 via a common thermal resistance $T_{R4}$, 184.

While it is the object of the present invention to make $T_{R4}$ as small as possible in order that the physical size of heat exchanger housing 177 be as small as possible, it is essential for the proper operation and control of temperature in MOS transistors 178 and heater element 179 ($R_L$) that the following thermal relationship exist between the associated thermal resistances when normalized to their respective areas:

$$T_{R1}=T_{R2}=T_{R3}<<T_{R4}$$

and that in all areas adjacent to power generating components 178 and 179, $T_{R4}$ 184 be the same as follows from the above equation. Thus, because components 178, 179 and 183 are thermally communicating with each other, the temperature of housing 177 is safely controlled, hence PTC 183 (R₂) via control circuit 185 controls the power generated in heater element 179 ($R_L$) and MOS power transistors 178, so as to seek to maintain housing 177 at a constant temperature, preferably 140° F. -150° F., rather than, as indicated in the prior art, controlling power based on the temperature of the fuel, which leads to the dangerous and undesirable situation of having the heat exchanger housing and at least some portion of the fuel contained therein, at temperatures well in excess of the flash point.

Control of heater operation is achieved since the heat flux Q through $T_{R4}$, in that $T_{R4}$ 184 changes with the velocity of fuel passing through heat exchanger 177, and Q is proportional to the Δ T between housing 177 and the fuel. Therefore, the following relationship applies: $Q_{TR4}$ is proportional to [Δ $T_{R4}$ x value of $T_{R4}$].

From this equation it also follows that since the housing 177 is maintained at an upper limit of, say, 150° F., the Δ $T_{R4}$ is proportional to the difference between the fuel temperature and 150° F. Hence, if the heat flux $Q_{TR4}$ becomes less than the power input from the combined power generated in heater element 179 ($R_L$) and transistors 178 then the temperature of housing 177 will rise until PTC 183 will cause circuit 185 to reduce power until thermal equilibrium is reached. In this way, PTC 183 regulates the power without directly sensing the temperature of the fuel.

What is claimed is:
1. A fluid heater comprising:
   a hollow housing of a heat-conductive material, the housing defining a fluid entrance at one end of the housing, a fluid exit at the opposite end of the housing, and an interior chamber communicating with the entrance and exit within which the fluid is heated;

fin means attached to the interior of the housing at spaced intervals throughout the chamber, said fin means being in heat-conductive relationship with the housing;

at least one planar heating means in heat-conducting surface contact relationship with the exterior of the housing for transmitting heat by conduction from the heating means through the housing to the chamber;

first circuit means for controlling electric current in said planar heating means;

second circuit means in electrical circuit relationship with the first circuit means for controlling the operation of said first circuit means;

temperature sensing means in surface contact with the exterior of said housing connected in electric circuit relationship with said second circuit means; and third circuit means in electrical circuit relationship with said second circuit means for protecting the first circuit means from thermal overload.

2. A fluid heater according to claim 1 wherein a first planar heating means is disposed in heat conducting surface contact with a first exterior surface of the housing for transmitting heat by conduction through said surface to the interior chamber in the housing, and a second planar heating means is disposed in heat conducting surface contact with a second exterior surface of the housing for transmitting heat by conduction through said surface to the interior chamber in the housing.

3. A fluid heater according to claim 1 or 2 wherein a plurality of nonthermally conductive fibers are located within the interior chamber of the housing, at least a portion of said fibers being in contact with the interior and fin means of the housing.

4. A fluid heater according to claim 3 wherein the density of the plurality of fibers is such as to occupy 15% or less of the physical volume of the interior of the chamber.

5. A fluid heater according to claim 2 wherein each of said planar heating means comprises a heater wire extending in a repetitive pattern across an exterior surface of the housing.

6. A fluid heater according to claim 3 including a block of nonporous material located within the plurality of fibers in the interior chamber in the housing.

7. A fluid heater according to claim 5 wherein the first circuit means for controlling current in the planar heating means comprises at least one metal oxide semiconductor power transistor.

8. A fluid heater according to claim 7 wherein the temperature sensing means is a positive temperature coefficient thermistor.

9. A fluid heater according to claim 8 wherein the positive temperature coefficient thermistor is fabricated of barium titanate.

10. A fluid heater according to claim 9 wherein the positive temperature coefficient thermistor is connected in series circuit relationship with the gate of the metal oxide semiconductor power transistor.

11. A fluid heater according to claim 7 wherein the first circuit means includes a pair of said power transistors and the third circuit means controls the operation of the power transistors and limits the operation of said transistors to either the high current, low resistance area or the low current, high resistance area.

12. A fluid heater according to claim 11 wherein the third circuit means comprises a pair of comparators which regulate a control flip-flop in response to a power transistor, the control flip-flop being coupled to an output amplifier which controls at least one power transistor, said power transistor powering one or more of said heating means.

13. A fluid heater according to claim 11 wherein the fluid heater is connected in a fluid supply line immediately upstream of a fluid filter.

14. A fluid heater according to claim 11 wherein the activation of the heating means is controlled by switch means remotely located from the heating means.

15. A heat exchanger for heating fluids comprising:
a hollow housing having a fluid entrance at one end and a fluid exit at the opposite end, the hollow housing defining a passage extending between the entrance and exit for heat exchange with a fluid to be heated;

a plurality of nonthermally conductive fibers located within the housing and occupying the space defined by the passage, at least a portion of the fibers being in contact with the interior surface of the housing, the density of the plurality of fibers being such as to occupy 15% or less of the physical volume of the passage; and heating means in physical contact with at least one external surface of the housing for transmitting heat by conduction through the walls of the housing to the interior surfaces thereof.

16. A heat exchanger according to claim 15 wherein the heating means has a pancake configuration and is mounted on a fluid filter at the inlet thereof.

17. A heat exchanger according to claim 16 wherein the housing and the passage defined thereby is elongated, said housing having the fluid entrance located at one end of the elongation and the fluid exit at the opposite end of the elongation and the passage extends therebetween.

18. A heat exchanger according to claim 17 wherein an elongated block of non-porous material is located inside the plurality of fibers in the passage through the housing.

19. A heat exchanger according to claim 16 wherein the hollow housing is formed by at least two spaced apart thermally conductive disks so as to form a disk-shaped cavity, said first disk being perforated at its outside perimeter to provide an entrance for fluid to be heated into the disk shaped cavity, and said second disk being perforated near its center to provide an exit of the fluid from the disk shaped cavity.

20. A heat exchanger according to claim 19 wherein fin means are located internally of the housing in heat conductive relation with the housing interior.

21. A diesel fuel heater comprising;
an elongated hollow housing of a heat-conductive material, said housing having a fluid entrance at one end of the elongated hollow housing, and a fluid exit at the opposite end of the elongated hollow housing, the entrance and exit defining a passage within which the fluid is heated;

fin means located inside the housing extending longitudinally within the passage in the direction of the housing elongation, the fin means being formed in the interior of the housing, and fabricated of the same material as the housing;

at least one planar heating means in heat-conducting surface contact relationship with the exterior of the housing;

first circuit means for controlling electric current in said planar heating means, said first circuit means being comprised of at least one metal oxide semiconductor power transistor;

second circuit means including a positive temperature coefficient thermistor in surface contact with the exterior of said housing, connected in electrical circuit relationship with the first circuit means for controlling the operation of said first circuit means; and third circuit means in an electrical circuit relationship with said second circuit means for protecting the first circuit means from thermal overload, said third circuit means being comprised of a pair of comparators which regulate a control flip-flop in response to the power transistor, the control flip-flop being coupled to an output amplifier for controlling at least one power transistor which provides electrical power to at least one planar heating means.

22. A heater for diesel fuel comprising;

an elongated hollow housing of a heat-conductive material, said housing having a fluid entrance at one end of the elongation and a fluid exit at the opposite end of the elongation, the hollow housing, entrance and exit defining a passage therethrough for the diesel fuel to be heated;

fin means located interiorly of the housing, said fin means being integral with the interior of the housing and fabricated of the same material as the housing, said fin means extending in the direction of elongation of the housing;

a plurality of nonthermally conductive fibers located within the passage in the interior of the housing, at least a portion of said fibers being in contact with the interior surfaces and fin means of the housing;

a block of non-porous material disposed interiorly of the fibers in the passage through the housing;

at least one planar heating means in heat-conducting surface contact relationship with the exterior of the housing;

first circuit means for controlling electric current in said planar heating means;

second circuit means in electrical circuit relationship with the first circuit means for controlling the operation of said first circuit means;

temperature sensing means in surface contact with the exterior of said housing connected in an electric circuit relationship with said second circuit means; and third circuit means in an electrical circuit relationship with said second circuit means for protecting the first circuit means from thermal overload.

23. A heater for diesel fuel comprising;

an elongated hollow housing of a heat-conductive material, said housing having a fluid entrance at one end of the elongation and a fluid exit at the opposite end of the elongation, the hollow housing, entrance and exit defining a passage therethrough for the diesel fuel to be heated;

a plurality of nonthermally conductive fibers located within the passage in the interior of the housing, at least a portion of said fibers being in contact with the interior surfaces of the housing;

a block of non-porous material disposed interiorly of the fibers in the passage through the housing;

at least one planar heating means in heat-conducting surface contact relationship with the exterior of the housing;

first circuit means for controlling electric current in said planar heating means;

second circuit means in electrical circuit relationship with the first circuit means for controlling the operation of the first circuit means;

temperature sensing means in surface contact with the exterior of said housing connected in an electric circuit relationship with said second circuit means; and third circuit means in an electrical circuit relationship with said second circuit means for protecting the first circuit means from thermal overload.

* * * * *